(12) United States Patent
Synnott et al.

(10) Patent No.: US 7,004,720 B2
(45) Date of Patent: Feb. 28, 2006

(54) COOLED TURBINE VANE PLATFORM

(75) Inventors: Remy Synnott, St-Jean-sur-Richelieu (CA); Ricardo Trindade, Saint Lambert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 10/736,625

(22) Filed: Dec. 17, 2003

(65) Prior Publication Data
US 2005/0135920 A1  Jun. 23, 2005

(51) Int. Cl.
*F01D 5/18* (2006.01)
(52) U.S. Cl. .................... 415/115; 416/96 R; 416/97 R
(58) Field of Classification Search ................ 415/115, 415/116; 416/97 R, 97 A, 90 R, 96 R
See application file for complete search history.

(56) References Cited

U.S. PATENT DOCUMENTS

| 3,610,769 | A | | 10/1971 | Schwedland et al. |
|---|---|---|---|---|
| 4,798,514 | A | | 1/1989 | Pask |
| 4,946,346 | A | * | 8/1990 | Ito .............................. 415/115 |
| 5,169,287 | A | | 12/1992 | Proctor et al. |
| 5,407,319 | A | | 4/1995 | Harrogate et al. |
| 5,417,545 | A | | 5/1995 | Harrogate |
| 5,470,198 | A | | 11/1995 | Harrogate et al. |
| 6,082,961 | A | | 7/2000 | Anderson et al. |
| 6,508,620 | B1 | | 1/2003 | Sreekanth et al. |
| 6,565,317 | B1 | * | 5/2003 | Beeck et al. ............... 416/97 R |
| 2003/0002975 | A1 | | 1/2003 | Dudebout et al. |

FOREIGN PATENT DOCUMENTS

EP  1 221 536  7/2002

* cited by examiner

*Primary Examiner*—Edward K. Look
*Assistant Examiner*—Dwayne J White
(74) *Attorney, Agent, or Firm*—Ogilvy Renault LLP

(57) ABSTRACT

A vane assembly for a gas turbine engine comprises a plurality of airfoils extending between platforms and a plurality of effusion holes which are defined in at least one of the inner and outer platforms in a region intermediate adjacent airfoils. The effusion holes provide fluid flow communication between a cooling air source and the gas path.

12 Claims, 6 Drawing Sheets

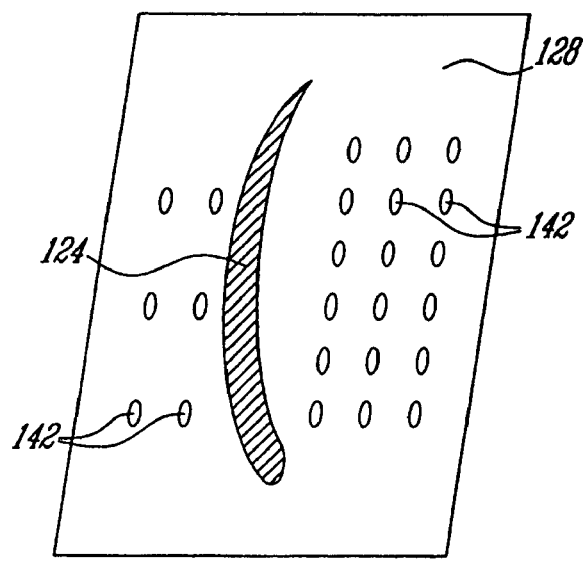
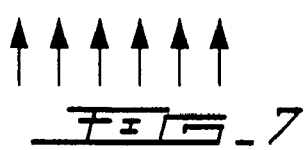
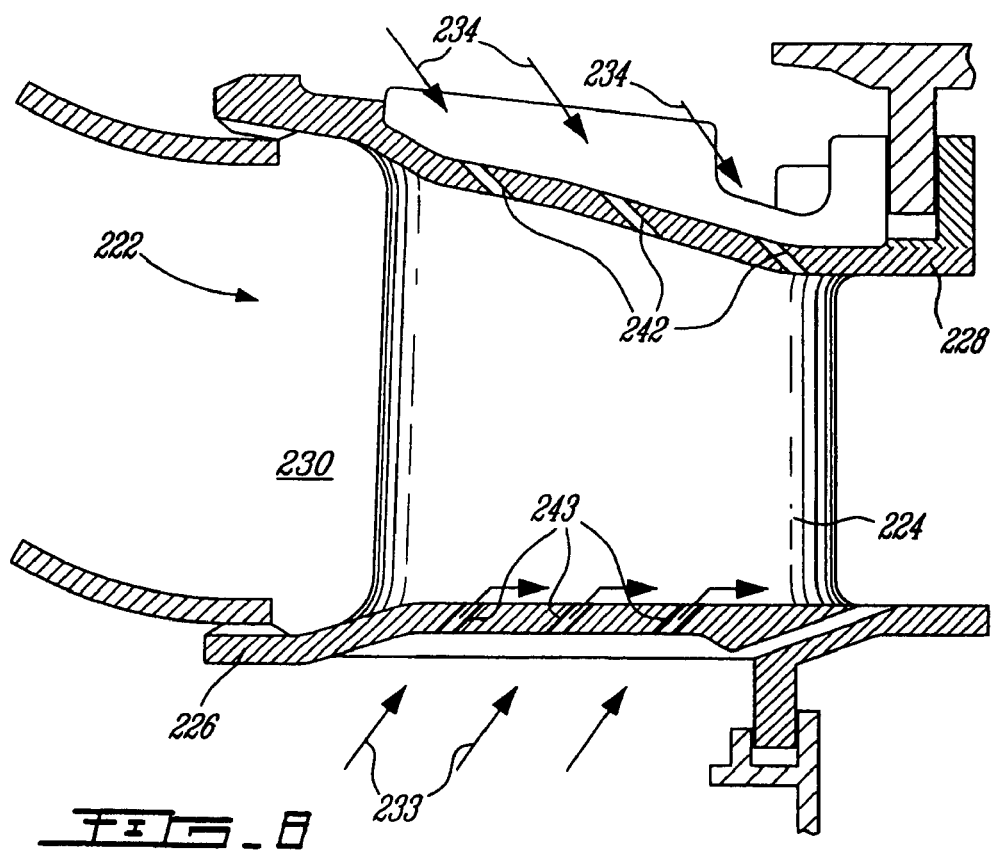

COOLED TURBINE VANE PLATFORM

TECHNICAL FIELD

The present invention relates generally to gas turbine engines, and more particularly to cooling turbine vanes therein.

BACKGROUND OF THE INVENTION

Turbine vane cooling improves component life. Vane platforms may be externally impingement cooled, as shown in FIG. 2, in which a cooling air flow 919 is directed to the plenum 916, thereby convectively cooling the outer surface 918 of the vane platform 915. It is also known to cool turbine vane platforms by film cooling, as shown in FIGS. 3a and 3b, and described in U.S. Pat. No. 5,417,545. A plurality of regularly-spaced cooling holes 922 in the platform 915, upstream of the airfoils 912, permit a cooling airflow to enter the gas path 917 and form a uniform film or blanket 924 of cool air on the vane platform in an attempt to insulate it from the hot gases. However, the solution of U.S. Pat. No. 5,417,545 is susceptible to the limited cooling ability of the thin air film in the face of the extreme temperatures, turbulence and varied temperature distribution of the combustion gases. Accordingly, improvements to the art are needed.

SUMMARY OF THE INVENTION

It is accordingly an object of the present invention to provide improved cooling to a turbine vane in a gas turbine engine.

Therefore, in accordance with the present invention, there is provided a vane assembly for a gas turbine engine, the vane assembly comprising a plurality of airfoils radially extending between inner and outer platforms defining an annular gas path therebetween, wherein a plurality of holes are defined in at least one of the inner and outer platforms in a region thereof substantially intermediate adjacent airfoils, the holes providing fluid flow communication between a cooling air source and the gas path and directing cooling airflow therethrough such that effusion cooling of the vane assembly is provided.

There is also provided, in accordance with the present invention, a vane assembly for a gas turbine engine, the vane assembly comprising: a first and a second platform and a plurality of airfoils extending radially therebetween, the airfoils having leading and trailing edges, the first platform having a plurality of effusion cooling holes defined therethrough in at least one region of the first platform, the region disposed between the airfoil leading and trailing edges, the holes permitting air flow communication through the first platform.

There is further provided, in accordance with the present invention, a method of cooling a vane assembly disposed in a gas path of a gas turbine engine, the vane assembly having a plurality of airfoils radially extending between inner and outer platforms, the method comprising: determining regions on the inner and outer platforms which experience highest gas flow temperatures; providing a plurality of holes in at least one of the inner and outer platforms and in at least the regions thereof substantially intermediate adjacent airfoils; directing compressed cooling air to inlets of the holes; and effusing the cooling air through the holes out into the gas path intermediate adjacent airfoils to cool the vane assembly.

BRIEF DESCRIPTION OF THE DRAWINGS

Further features and advantages of the present invention will become apparent from the following detailed description, taken in combination with the appended drawings, in which:

FIG. 7 is a schematic cross-section view taken transversely through an alternate vane assembly of the present invention; and FIG. 8 is a cross-section view of a cooled turbine vane assembly in accordance with another alternate embodiment of the present invention.

DETAILED DESCRIPTION OF THE PREFERRED EMBODIMENT

Figure 1:
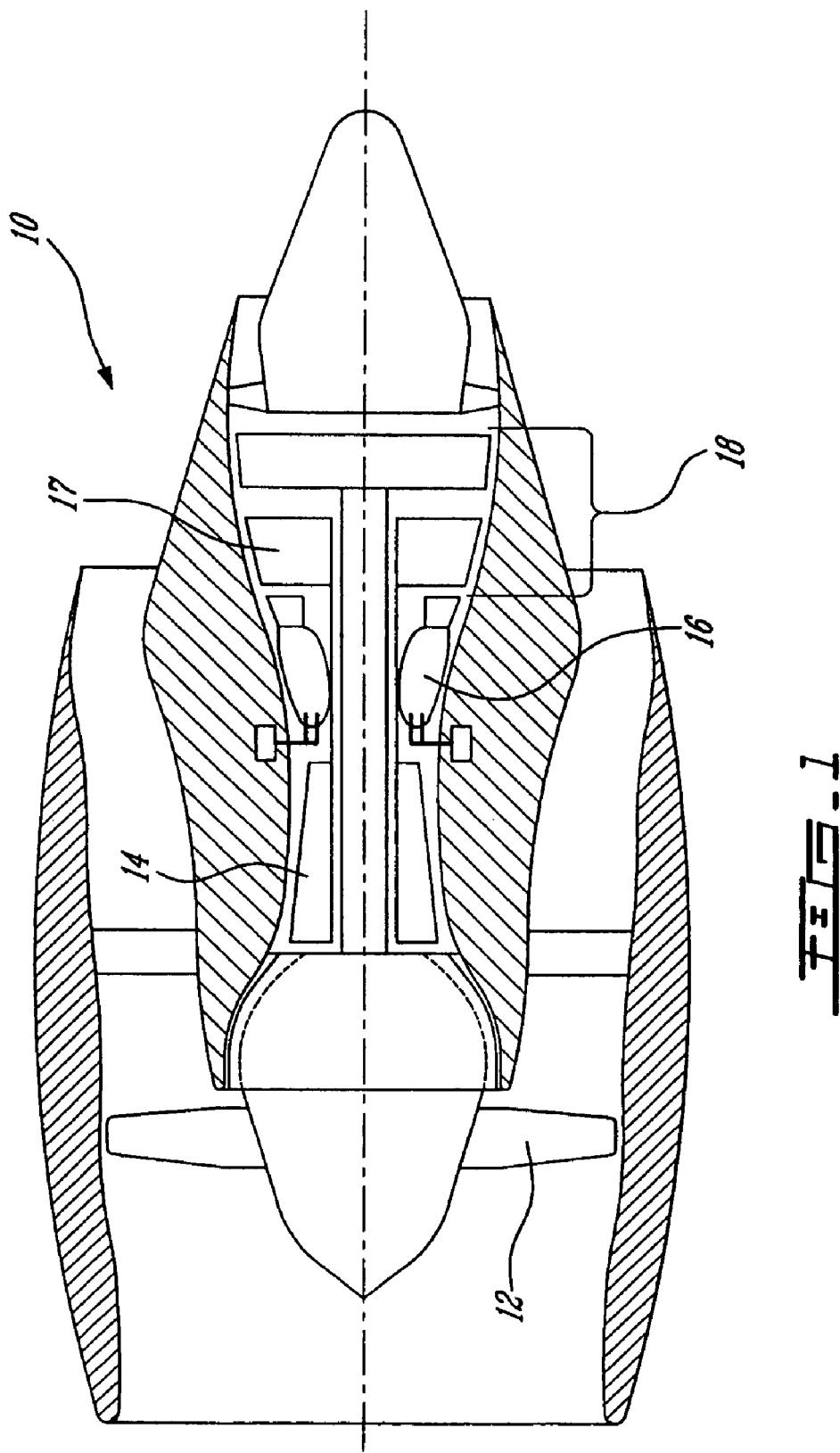
FIG. 1 is a schematic cross-section of a gas turbine engine having a turbine vane in accordance with the present invention.
Figure 2:
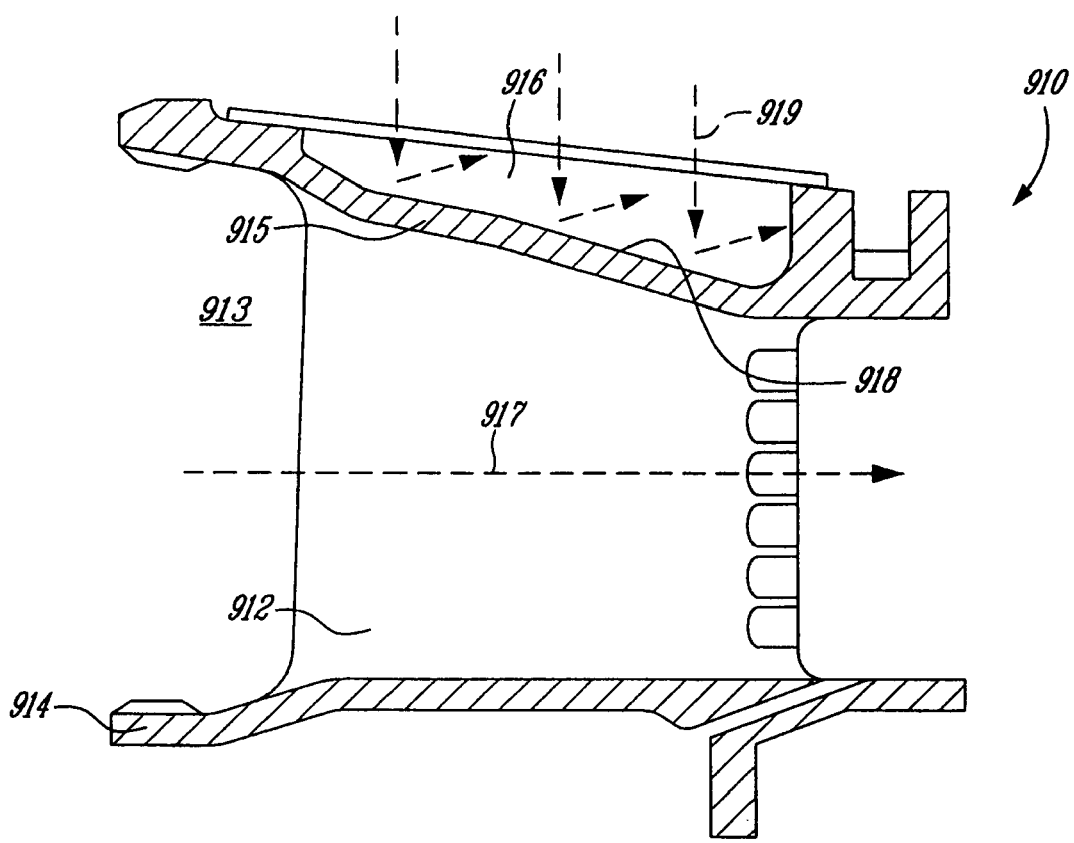
FIG. 2 is a side elevation view of a turbine vane of the prior art.
Figure 3A:
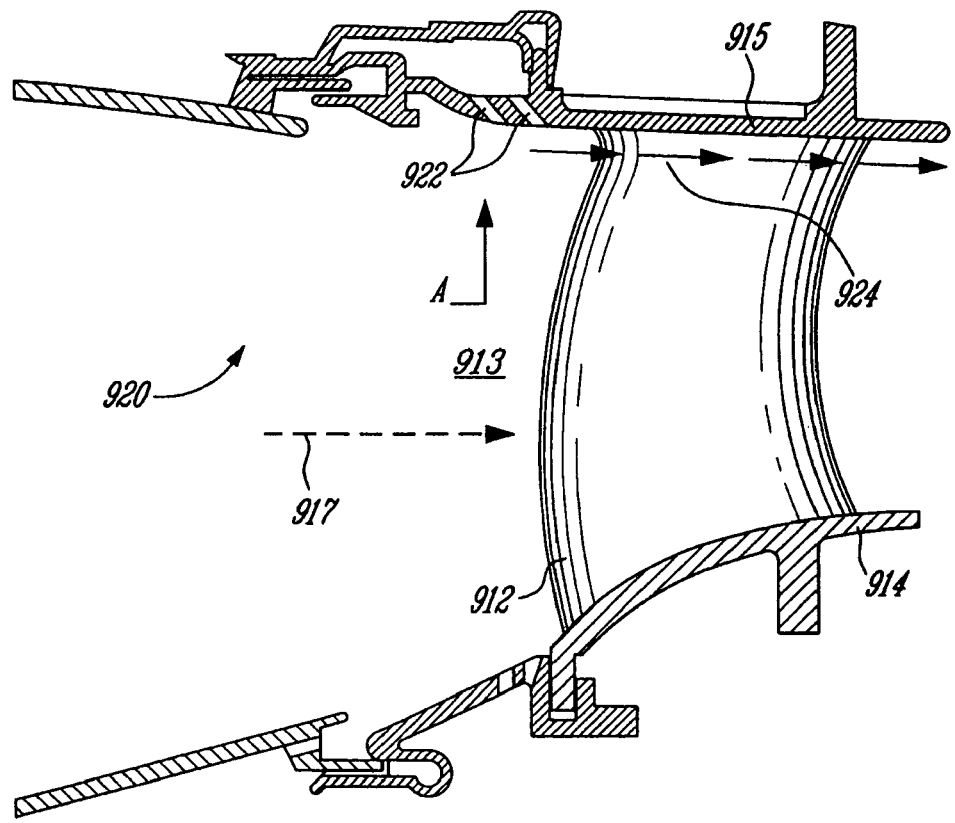
FIG. 3a is a side elevation view of another prior art turbine vane.
Figure 3B:
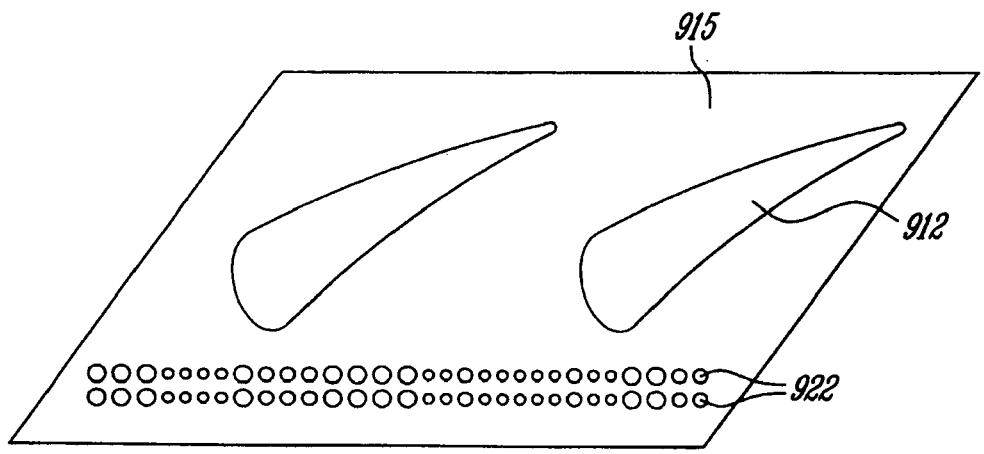
FIG. 3b is a view in the direction of arrow A in FIG. 3a of the prior art turbine vane shown therein.

FIG. 1 schematically illustrates a gas turbine engine 10 (a turbofan preferably adapted for use on an aircraft in subsonic flight in this case, though the invention may be practised in almost any gas turbine engine) generally comprising, in serial flow communication, a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The turbine section 18 may comprise one or more turbine stages, in this case two are shown including a first, or high pressure (HP), turbine stage 17, which includes a turbine rotor with a plurality of radially extending turbine blades and a turbine vane assembly in accordance with the present invention.

Figure 4:
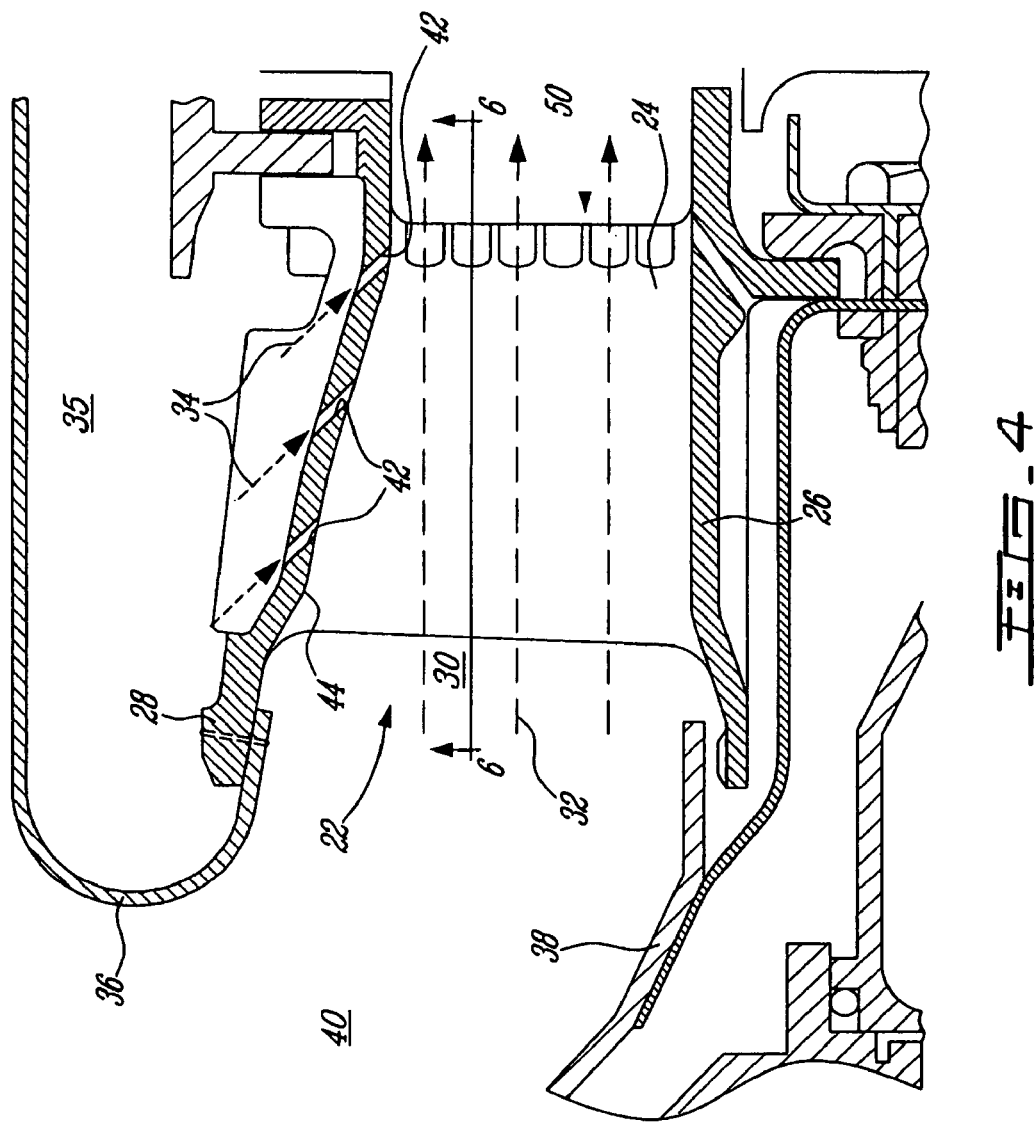
FIG. 4 is a detailed cross-section view of the cooled turbine vane assembly of the present invention.
Figure 5:
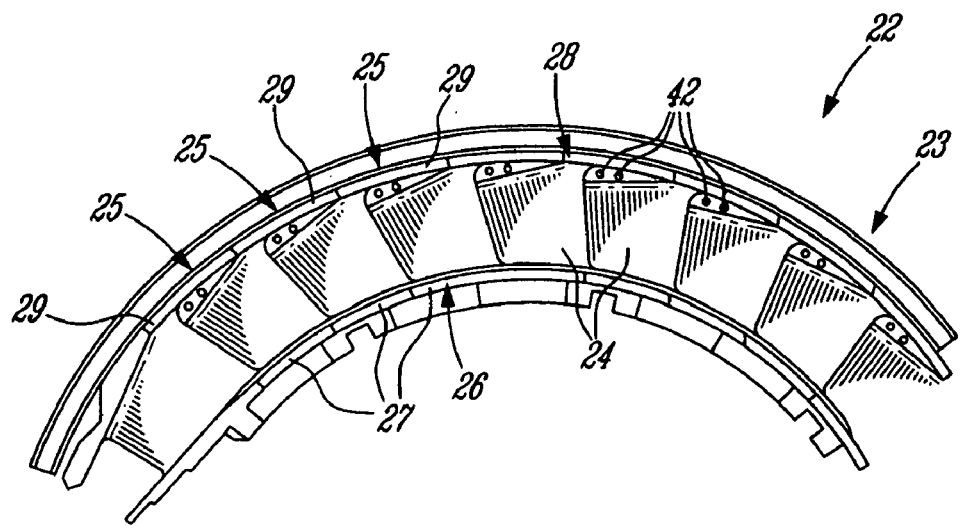
FIG. 5 is a partial front elevation view of the cooled turbine vane assembly of FIG. 4.
Figure 6:
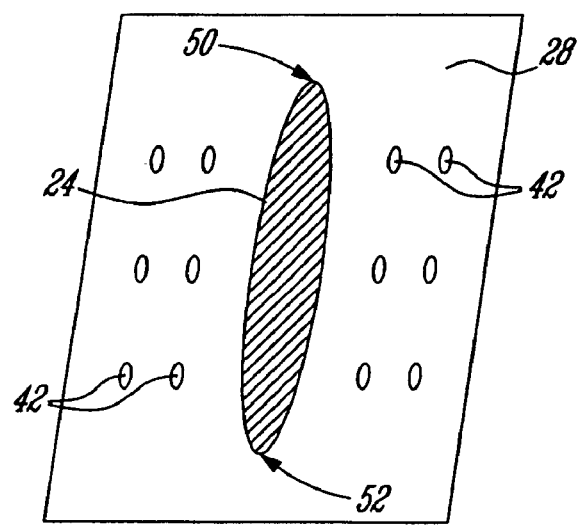
FIG. 6 is a schematic view of a cooled turbine vane of the present invention if a section were taken through line 6—6 of FIG. 4.
Figure 6:

Referring now to FIGS. 4 to 6, the turbine vane assembly 22 of the present invention provides improved cooling using a relatively simple and cost effective cooling arrangement. The turbine vane assembly 22 comprises generally a plurality of airfoils 24 which extend substantially radially between an inner vane platform 26 and an outer vane platform 28, which define an annular passage 30 therebetween. The outer vane platform 28 sealingly engages the outer combustion chamber wall 36 and the inner vane platform 26 sealingly engages the inner combustion chamber wall 38, thereby defining therebetween the annular hot gas path from the combustion chamber outlet 40 through the annular passage 30 in longitudinal fluid flow direction 32.

Cooling air from the cooling air source cavity 35 is used to cool the vane assembly 22. Particularly, cooling airflow 34 from the cavity 35 is directed through a plurality of radially extending holes 42 defined in the outer platform 28, at least in regions substantially between the airfoils 24. The holes 42 are preferably evenly defined in the outer platform 28 relative to a longitudinal fluid flow direction 32. Further, as seen in FIG. 6, the holes 42 are preferably transversely evenly distributed on either side of the airfoil 24. As seen in FIG. 4, the holes 42 are also preferably inclined inwardly and downstream in the direction of hot gas flow 32, such that the cooling airflow 34 exiting from the holes 42 defines an acute angle relative to the inner surface 44 of the outer platform 28.

The present invention provides a better control over local cooling as well as cooling intermediate adjacent airfoils 24, than does the prior art. Particularly, the film cooling effect provided by the prior art turbine vanes quickly decreases as it gets further downstream from the film holes, and therefore provides inadequate cooling of the entire vane assembly. Although the holes 42 are depicted only in the outer platform 28, corresponding holes can also be defined in the inner platform as depicted in FIG. 8 and described in greater detail below.

Referring to FIG. 5, the turbine vane assembly 22 preferably comprises a plurality of individual vane segments 25 arranged and interlocked in an annular array to form an annular stator vane ring 23. The vane segments 25 each comprise an airfoil 24 integrally formed with, and radially extending therebetween, an inner platform segment 27 and an outer platform segment 29. However, the turbine vane assembly 22 can also be manufactured as a one-piece annular stator vane ring, wherein the inner platform 26, the airfoils 24 and the outer platform 28 are all integrally formed.

Referring back to FIG. 6, the holes 42 in the outer platform 28 are preferably evenly distributed in a transverse direction (ie: transverse to fluid flow direction 32) on either side of the airfoil 24, and are preferably disposed between the leading edge 52 and the trailing edge 50 of the airfoil 24 in the longitudinal fluid flow direction 32.

However, any number of holes in a symmetric or asymmetric distribution pattern may be used as necessary to sufficiently cool the vane assembly. As shown in the alternate embodiment of FIG. 7, holes 142 are not evenly distributed in the outer platform 128, but rather are arranged such that more holes are grouped in the hottest areas of the platform 128, for example on the pressure side of the airfoil 124 as depicted. These "hot spots" can be theoretically or experimentally determined according to any suitable technique known in the art.

The size and number of holes 42, 142 are chosen to provide the necessary cooling airflow coverage, which depends largely on the temperature of the hot gas flow. Advantageously, therefore, the diameter, shape, profile, degree of convergence/divergence (if any), distribution and number of holes can thus be provided in such balanced or unbalanced manner as desired or necessary to achieve a desired cooling airflow coverage. Unlike the prior art, the present invention gives the designer much more flexibility in increasing component life based on aspects of gas turbine design particular to his/her design context. Furthermore, the present invention allows the designer to provide cooling, as needed, across the entire vane segment.

The cooling air fed into cavity 35 is preferably "P3" air, which is bled from the compressor discharge air, however other suitable cool air sources can also be used.

In another alternate embodiment of the present invention as depicted in FIG. 8, the turbine vane assembly 222 comprises a plurality of airfoils 224 which extend substantially radially between an inner vane platform 226 and an outer vane platform 228, which define an annular passage 230 therebetween. Cooling air from a cooling air source is used to cool the vane assembly 22. Particularly, cooling airflow 234 is directed through a plurality of holes 242 defined in the outer platform 228, at least in regions thereof substantially between the airfoils 224. The holes 242, preferably inclined inwardly and downstream in the direction of hot gas flow through the annular passage 230, permit the cooling airflow 234 exiting from the holes 242 to enters the hot gas flow, thereby cooling the airfoil 224 and the outer platform 228. The inner platform 226 of the turbine vane assembly 222 also includes a plurality of cooling holes 243 defined therein, located in regions thereof substantially between the airfoils 224. The cooling holes 243 permit cooling airflow 233, provided from either the same cooling air source or an alternate cooling air source, to flow through the inner platform 226 and into the hot gas flow, thereby cooing the airfoil 224 and the inner platform 226. Although the turbine vane assembly 222 shows holes defined in both the inner and outer vane platforms, holes which conduct cooling airflow therethrough can be defined in either one of the outer and inner platforms.

The embodiments of the invention described above are intended to be exemplary. Still other modifications are available, and those skilled in the art will therefore appreciate that the forgoing description is illustrative only, and that various alternatives and modifications can be devised without departing from the spirit of the present invention. Accordingly, the present invention is intended to embrace all such alternatives, modifications and variances which fall within the scope of the appended claims.

What is claimed is:

1. A high pressure turbine vane assembly for a gas turbine engine, the vane assembly comprising a plurality of airfoils radially extending between inner and outer platforms defining an annular gas path therebetween, at least one of the inner and outer platforms being sealingly engaged to a downstream end of a combustion chamber wall enclosing a combustion chamber of the gas turbine engine in fluid flow communication with said annular gas path, said at least one of said inner and outer platforms defines an inner surface facing said annular gas path and an outer surface which encloses at least part of a cooling air cavity defined between the combustion chamber wall and said at least one of said inner and outer platforms, said outer surface being directly exposed to cooling airflow within said cooling air cavity. wherein a plurality of holes extend between said outer surface and said inner surface within a region of said at least one of the inner and outer platforms substantially intermediate adjacent airfoils, the holes providing fluid flow communication between the cooling air cavity and the annular gas path and directing cooling airflow therethrough such that effusion cooling of the vane assembly is provided.

2. The vane assembly as defined in claim 1, wherein the holes are substantially evenly distributed adjacent either side of the airfoils.

3. The vane assembly as defined in claim 1, wherein the holes are disposed in a longitudinal fluid flow direction between leading edges and trailing edges of the airfoils.

4. The vane assembly as defined in claim 1, wherein the holes are inclined downstream, such that the cooling airflow exits the holes defines an acute angle relative to the at least one of the inner and outer platforms.

5. The vane assembly as defined in claim 1, wherein the holes are asymmetrically distributed in the platform relative to the airfoils.

6. The vane assembly as defined in claim 5, wherein the holes are concentrated in a manner corresponding to regions of the platform experiencing at least one of highest gas flow temperatures and highest heat transfer coefficients.

7. A vane assembly for a gas turbine engine, the vane assembly comprising: a first and a second platform and a plurality of airfoils extending radially therebetween, the airfoils having leading and trailing edges, at least the first platform is sealingly engaged to a wall portion of a gas conveying means disposed immediately upstream from said first platform, said gas conveying means being for directing a gas flow of said gas turbine engine to said airfoils, said first platform having an inner surface exposed to said gas flow between said first and second platforms and an outer surface which encloses at least part of a cooling air cavity defined between said wall portion and said first platform and which receives cooling airflow from a cooling air source of the gas turbine engine, said outer surface being directly exposed to said cooling airflow within said cooling air cavity, said first platform having a plurality of effusion cooling holes defined therein and extending between said outer and inner surfaces within at least one region of the first platform disposed between the airfoil leading and trailing edges, the holes permitting air flow communication through the first platform from said cooling air cavity to said gas flow between said first and second platforms.

8. The vane assembly of claim 7, wherein the region, in use, corresponds to at least one of highest gas flow temperatures and highest heat transfer coefficients experienced by the vane assembly.

9. The vane assembly of claim 7, wherein the at least one region comprises at least one region between each of adjacent pairs of said airfoils.

10. The vane assembly of claim 7, wherein the region is asymmetrically disposed relative to a pair of said airfoils immediately adjacent the region.

11. The vane assembly of claim 7, wherein the holes are substantially evenly distributed adjacent either side of the airfoils.

12. A method of cooling a vane assembly disposed in a gas path of a gas turbine engine, the vane assembly having a plurality of airfoils radially extending between inner and outer platforms each having a first surface enclosing said gas path and an opposed second surface, the method comprising:

determining regions on the inner and outer platforms which experience highest gas flow temperatures;

providing a plurality of holes extending between said first and second surfaces of at least one of the inner and outer platforms and in at least the regions thereof substantially intermediate adjacent airfoils, said at least one of the inner and outer platforms defining an upstream heat transfer interface of said vane assembly;

directing compressed cooling air from a cooling source to a cavity defined at least partially between said second surface of said at least one of the inner and outer platforms and a means for conveying the gas path disposed immediately upstream of said at least one of the inner and outer platforms, said cooling air within said cavity being in direct fluid flow communication with said gas path via said holes; and effusing the cooling air through the holes out into the gas path intermediate adjacent airfoils to cool the vane assembly.

* * * * *